United States Patent [19]

Friesen

[11] Patent Number: 4,943,221

[45] Date of Patent: Jul. 24, 1990

[54] ROTATIONAL MOULDING MACHINE

[76] Inventor: Peter Friesen, R.R.#1, Box 314, Group 24, Winkler, Manitoba, Canada, R0G 2X0

[21] Appl. No.: 349,359

[22] Filed: May 8, 1989

[51] Int. Cl.$^5$ ............................................. B29C 41/06
[52] U.S. Cl. ...................................... 425/73; 425/429; 425/435
[58] Field of Search ............... 425/435, 429, 439, 425, 425/73; 249/137

[56] References Cited

U.S. PATENT DOCUMENTS

| | | | |
|---|---|---|---|
| 4,102,624 | 7/1978 | Corona | 425/435 |
| 4,695,244 | 9/1987 | Friesen | 425/435 |
| 4,738,815 | 4/1988 | Friesen | 425/135 |

FOREIGN PATENT DOCUMENTS

| | | | |
|---|---|---|---|
| 2416818 | 10/1975 | Fed. Rep. of Germany | 425/429 |
| 46-28664 | 8/1971 | Japan | 425/435 |
| 48-27912 | 8/1973 | Japan | 425/425 |
| 51-591 | 1/1976 | Japan | 425/435 |
| 56-154027 | 11/1981 | Japan | 425/425 |
| 515646 | 7/1976 | U.S.S.R. | 425/435 |

Primary Examiner—James C. Housel
Assistant Examiner—Anthony Weier
Attorney, Agent, or Firm—Adrian D. Battison; Stanley G. Ade; Murray E. Thrift

[57] ABSTRACT

A clam shell rotational moulding machine of a type including a housing having a base portion with a flat base and four upstanding sides and a cover portion with a top and four depending sides can be moved from a fully closed position in which the top and base co-operate to form an enclosed housing to an open position in which the cover portion is lifted and a front one of the side walls of the base is opened to a horizontal position above a pivot axis across the bottom of the front wall. A spindle arm assembly normally mounted during the moulding process within the housing and extending into the housing through the side walls can be moved from the normal position to an unloading position. The spindle arm assembly is mounted upon a cantilever arrangement carried by a rigid frame mounted on the front door. Opening of the front door thus moves the spindle arm assembly and attached moulds to the unload position substantially vertically above the horizontal surface of the front door.

11 Claims, 3 Drawing Sheets

ROTATIONAL MOULDING MACHINE

BACKGROUND OF THE INVENTION

This invention relates to a rotational moulding machine which defines a chamber which can be closed and heated to apply heat to a mould mounted upon a spindle arm within the chamber.

Examples of a machine of this type are shown in U.S. Pat. Nos. 4,767,299 and 4,738,815 both by the present applicant. Each of these patents shows a single chamber which is known as a clam shell arrangement including a base for resting on the ground, four upstanding side walls surrounding the base all terminating at a position approximately halfway up the chamber and a cover which includes a top portion and four side walls depending downwardly to meet the top of the side walls of the base portion. The cover can be pivoted upwardly to expose the interior of the chamber. A front door on the base can be pivoted downwardly to allow access by the operator to the interior of the chamber.

Generally the mould is mounted upon a spindle arm assembly carried by frame structure on either side of the housing with the arm extending into the housing between the base portion and the cover. The spindle arm assembly remains effectively permanently within the housing. A heating arrangement is provided for the chamber and in addition a cooling arrangement is provided for the chamber so that the mould can be filled by the operator entering the unit by the front door, can be rotated and heated to provide a curing action of the material in the mould, can be rotated and cooled and finally can be unloaded while the mould on the spindle arm remains within the chamber at all times.

This device has been very successful and it has become widely used. However in some cases the fact that the spindle arm is mounted in the chamber throughout the process makes it more difficult for the operator to gain access to the mould and for the mould to be positioned for automation of the process in which the loading and unloading are carried out without the necessity for human operation.

SUMMARY OF THE INVENTION

It is one object of the invention, therefore, to provide an improved design of rotational moulding machine which enables the mould to be presented at a location more convenient for loading and unloading.

The invention, therefore, provides a rotational moulding machine comprising an enclosed housing defining a chamber for receiving and processing a mould, a spindle arm assembly having means thereon for attaching said mould thereto and drive means for rotatably moving said mould about two axes, heating means for supplying heat into said housing for heating said mould, and door means in said housing arranged for movement into an open position to allow access into said housing and into a closed position to fully close said housing for processing of said mould, said spindle arm assembly being mounted relative to said door means such that movement of said door means into said open position causes the spindle arm assembly and mould to be moved to a position exteriorly of the housing for loading and unloading the mould.

The mould, when the front door is then opened can thus be moved to a position in which it stands vertically upwardly from an inner face of the front door for ready access for the further processing.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
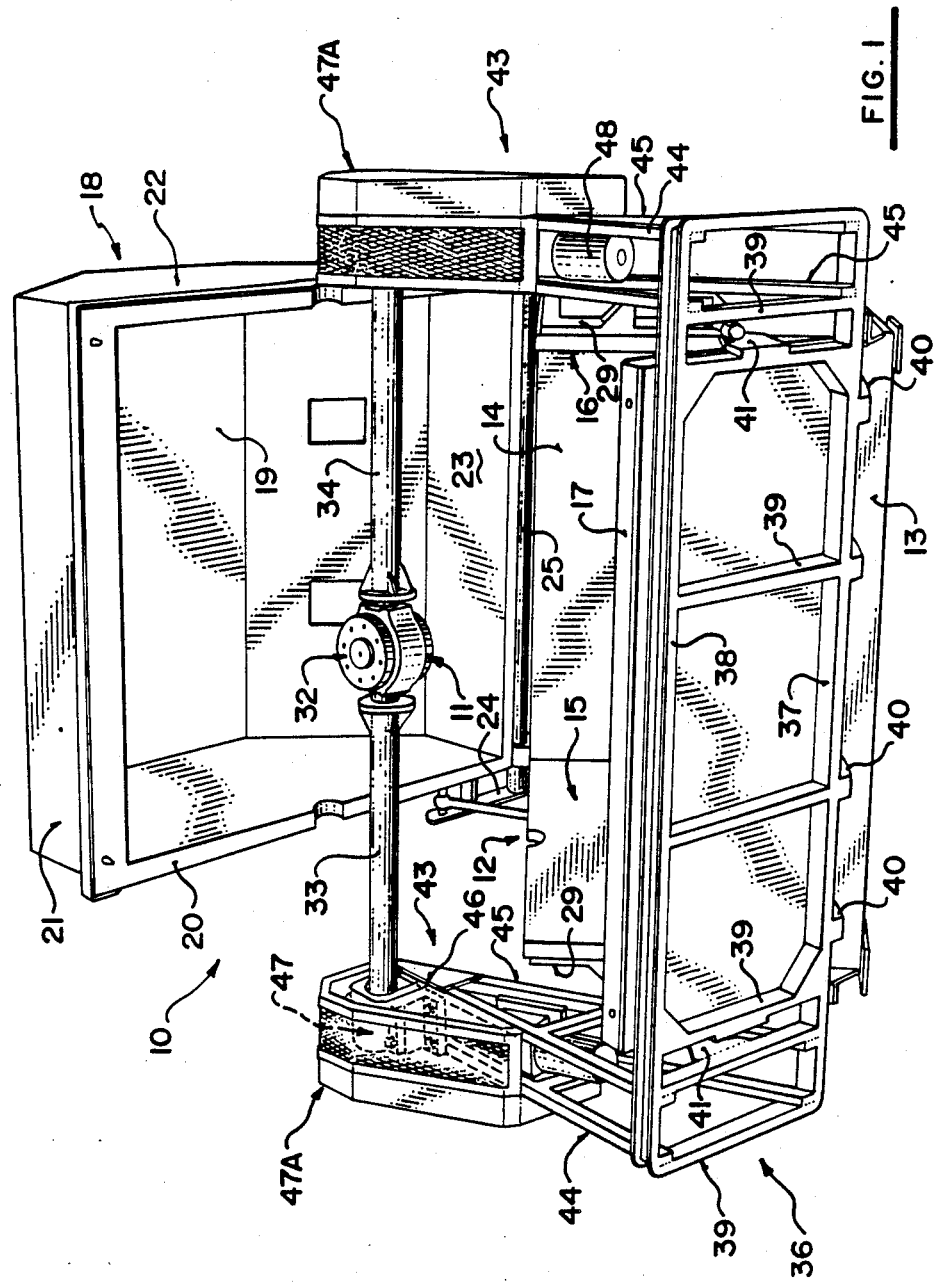
FIG. 1 is an isometric view of a rotational moulding machine according to the invention.

Attention is firstly directed to the above mentioned U.S. patents which disclose in extensive detail a rotational moulding machine of a type known as a clam shell machine. While the basic elements of this machine will be described herein, the reader may wish to refer to the above patents for yet further details of the operation and many parts of the device which are omitted from the present description for convenience of illustration and simplicity of description.

Basically, the rotational moulding machine comprises a housing 10 for containing a mould (not shown) mounted upon a spindle arm assembly 11. The housing 10 includes a base portion 12 having a base member 13 arranged to rest on the ground and 4 upstanding side walls 14, 15, 16 and 17 defining a rectangular box with an open top. The cover member 18 includes a top 19 and four depending side walls 20, 21, 22 and 23 thus forming an inverted hollow box with an open bottom shaped to cooperate directly with the open top of the base 12.

The cover member 19 includes a frame 24 which carries a pair of pivot couplings 25 mounting the cover member on the base 12 for pivotal movement about horizontal axis at a rear of the cover member. In this way the cover member can be moved from a closed position shown in FIG. 2 in which the housing is substantially tightly closed, to an open position in which the cover member is raised to allow access to the spindle arm 11.

Other designs of cover member are possible which open in different ways for example by a sliding action.

The front wall 17 of the base portion comprises a door which defines the whole of the front wall of the open box shape of the base portion and is pivotal about a shaft 27 defining a pivot access at the bottom of the door that is adjacent the front edge of the base portion 13. The shaft 27 is carried on a suitable frame structure 28 mounted on a stantion 29 on an outer side of each of the side walls 15 and 16 at the front edge thereof. Stantion 29 provides sufficient strength to support the frame member 28 and shaft 27 so that the door is wholly supported thereby. A hydraulic cylinder 30 is pivotally mounted on a stantion 29 by a pivotal mounting element 31. As can be seen by comparison of FIGS. 2 and 3, the cylinder 30 can be actuated to open and close the door 17 from the horizontal position in FIG. 3 which is fully opened to the fully closed position shown in FIG. 2 in which the door is vertical an contacting the front edges of the side walls 15 and 16 in a substantially sealing fit.

The spindle arm 11 includes a central portion 32 to which a mould can be attached for rotation of the mould about two orthogonal axis. The arm further includes two arm portions 33 and 34 each of which extends from the centre portion 32 outwardly to a respective side of the housing. Drive to the centre portion 32 is provided through the arm portions 33 and 34 to provide the required rotation at controllable speeds.

The housing contains a heating burner, a fan for causing circulation of air, and ducts which enable the circulating air to be retained in the heated condition during the heating cycle of the moulding process and to be extracted from the exterior in a cooling cycle of the process when the heating burner is turned off.

The above arrangement of clam shell moulding machine is basically a known device as shown from the previous patents and operates to carry out the rotational moulding process in which the mould remains substantially constantly within the enclosure with the front door and upper cover being openable during parts of the processing cycle to allow access to the mould and to allow heated air to escape from the container during the cooling process.

Figure 3:
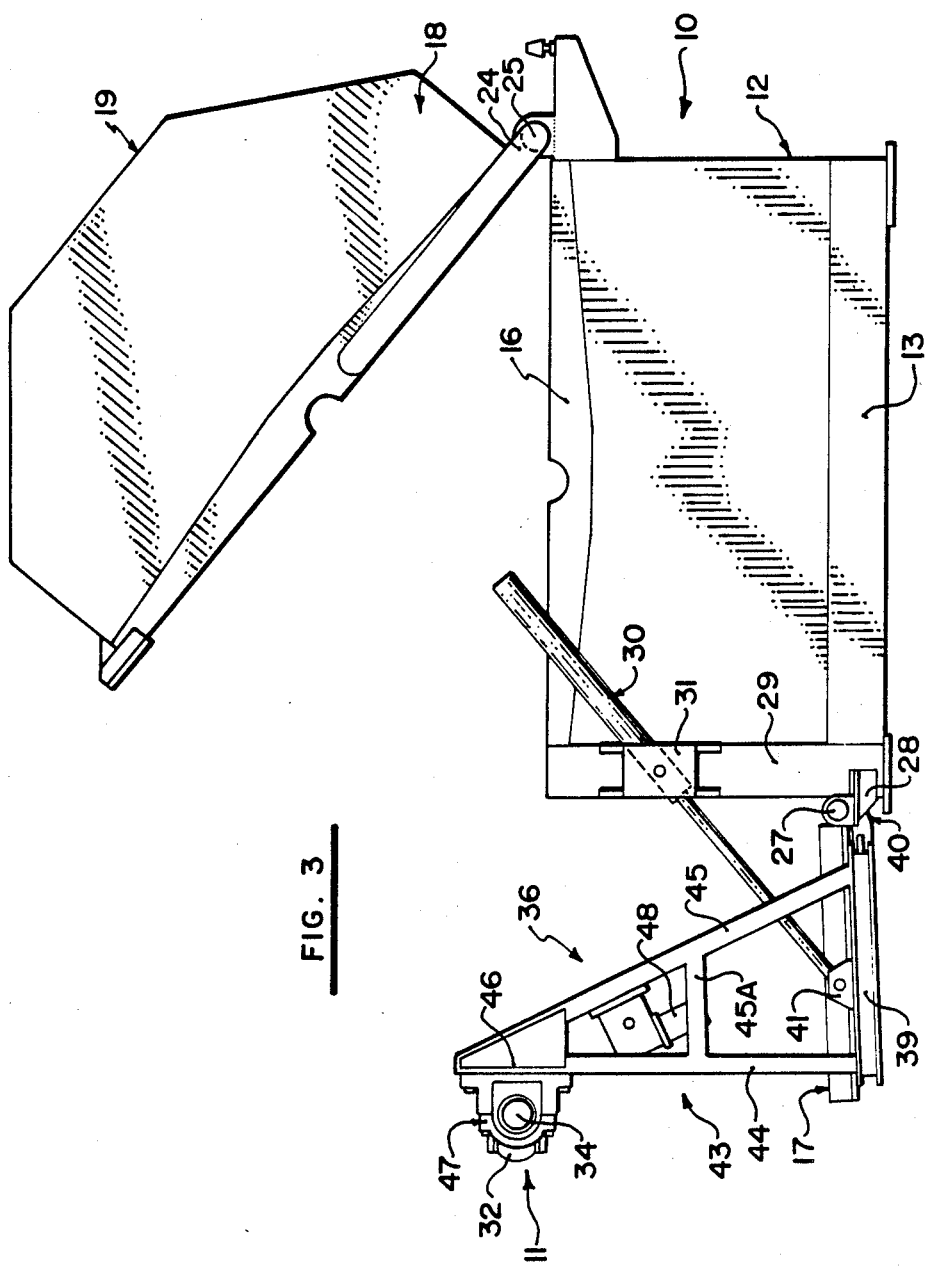
FIG. 3 is a side elevational view from the same side as FIG. 2 showing the machine in an opened condition with the spindle arm assembly removed to a position outside of the mould.

At present the invention provides an arrangement which is modified so that the spindle arm assembly 11 can be moved to a position shown in FIG. 3 in which it is more accessible for loading and unloading of the mould.

For this purpose the door 17 is mounted on a rigid structural frame 36. The frame 36 includes a lower horizontal rail 37, an upper horizontal rail 38 and struts 39, 40 into a rectangular rigid structure mounted for pivotal movement on the shaft 27 by way of a plurality of brackets 40.

The frame 36 projects outwardly beyond the ends of the door 17. Each projecting portion includes a pair of vertical struts 39 one of which is arranged at the end of the frame and the other of which is spaced from the end of the frame but is positioned outwardly of the side edge of the door.

As best shown in FIG. 3, the end of the piston rod of the cylinder 30 is connected by a pivot bracket 41 to one of the struts 39 so that the action of the cylinder 30 occurs on the rigid frame structure.

At each end of the rigid frame structure is mounted a cantilever support section generally indicated at 43. Support section comprises a pair of upper rails 44 and a pair of lower rails 45 so the upper rails 44 extend out from the rigid frame structure generally at right angles thereto. The lower rails 45 extend from the bottom of the rigid frame upwardly toward the upper rails 44 and interconnect therewith at a platform 46. A cross brace 45A is provided so that the cantilever support section is rigid and rigidly supported by the rigid frame 36.

On the platform 46 is mounted a bearing block 47 which supports the arm portion 34 for rotation relative to the cantilever support section.

Figure 2:
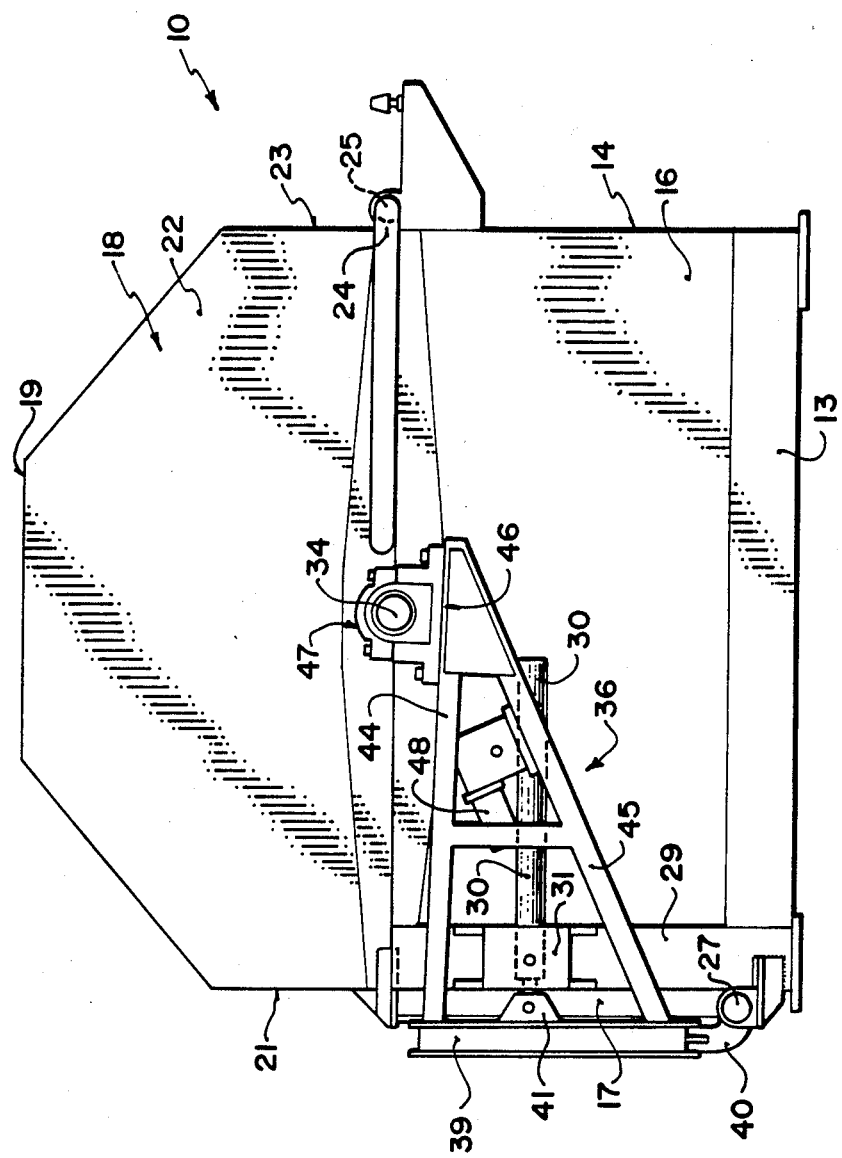
FIG. 2 is a side elevational view of the machine of FIG. 1 in a closed condition of the machine.

For convenience of illustration in FIGS. 2 and 3, a drive system for the outboard end of the spindle arm portion is omitted since this is a conventional construction which can be designed by one skilled in the art by reference to known techniques and taking further information from the above mentioned patents. It is suffice to say that the drive system includes a motor 48 and drive linkage which is omitted. A protective cage 47A for surrounding the moving parts can also be provided on the cantilever support structure so the motor, the linkage and the end of the spindle arm portion are all covered.

As will be observed by a comparison of FIGS. 2 and 3, in the position shown in FIG. 2, with the door 17 closed by retraction of the cylinder 30, the spindle arm assembly is mounted substantially centrally within the housing with the spindle arm portions projecting between the top edge of the side walls of the base and the bottom edge of the side walls of the cover. For this purpose a semi-circular recess can be provided in each of the side walls so the side walls can fully close around the spindle arm assembly. In this closed position the moulding process can be carried out by the application of heat, rotation of the spindle arm and by the circulation of heating air. Subsequent to the heating process, the cover member can be opened to allow heat to escape following which cooling air is injected to cool the mould and complete the cooling process of the material within the mould.

When the moulding process is complete, the cylinder 30 can be actuated to open the front door 17 this opening movement simultaneously causes the spindle arm to be pivoted about an arc centred on the shaft 27 through the partly opened position shown in FIG. 1 to the fully opened position shown in FIG. 3. In this fully opened position the spindle arm is moved to a position substantially vertically above the door 17 so that the mould is presented outwardly of the machine for ease of access by an operator or for automated operation by a travelling robotic device.

It will be appreciated that the mould or moulds carried on the spindle arm assembly can have a maximum diameter or spacing from the axis of the spindle arm which is such that they do not contact the inner surface of the housing when rotating within the housing during the moulding operation. The height of opening of the cover portion in the position shown in FIG. 3 is sufficient so that the moulds can pass under the upper edge of the cover portion as they are pivoted on the arc from the operating position shown in FIG. 2 to the unload position shown in FIG. 3.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A rotational moulding machine comprising a housing that encloses and defines a chamber for receiving and processing a mould, a spindle arm member having means thereon for attaching said mould thereto and being rotatable for rotatably moving said mould, support means for said spindle arm member and means mounted on said support means for driving said spindle arm member, and door means in said housing arranged for movement into an open position to allow access into said housing and into a closed position to fully close said housing for processing of said mould, said support means being mounted to said door means for movement therewith such that movement of said door means into said open position cause the support means, the spindle arm member and the mould to be moved to a position exteriorly of the housing for loading and unloading the mould.

2. The machine according to claim 1 wherein the housing comprises a base portion including a base member for mounting the base portion upon a floor surface, and a plurality of upstanding walls surrounding the base member including a front wall, a rear wall and two side walls, the door means being provided in one of said upstanding walls, and the housing further comprises an upper cover member which is movable to allow vertical access to said base portion.

3. The machine according to claim 2 wherein the upper cover member includes a top and a plurality of depending side walls so as to form with said base portion a clam shell housing arrangement which in a closed position thereof encloses the chamber, the upper cover member being movably mounted on said base portion from said closed position to an open position in which the cover member is moved away from an upper edge of said upstanding walls to allow vertical access to said base portion.

4. The machine according to claim 3 wherein the spindle arm member is mounted on said support means so that it enters the housing at said upper edge of said upstanding walls so as to be fully exposed and releasable when the upper cover member is in an open position.

5. The machine according to claim 1 wherein the door means comprises a hinged door panel pivotally moveable about a horizontal axis at and parallel to a bottom edge of the door panel.

6. The machine according to claim 1 wherein said support means is directly and fixedly mounted on a support structure connected to the door means which includes a planar door panel.

7. The machine according to claim 1 wherein the support means is directly and fixedly mounted on a support structure connected to the door means, the door means comprised of a door panel being hingedly mounted for pivotal movement about a horizontal axis at a bottom edge of said door panel of the door means so that the spindle arm member is moved during an opening movement of the door means from a position inwardly of the chamber to a position directly above the opened door panel exteriorly of the chamber.

8. The machine according to claim 6 wherein the support structure includes a first frame portion lying substantially in the plane of the door panel and two cantilever frame portions each extending therefrom in a direction inwardly of the chamber.

9. The machine according to claim 8 wherein the cantilever frame portions are mounted on the first frame portion so that each is arranged on a respective side edge of the first frame portion which in a closed position of the door means lies exteriorly of the chamber so each cantilever frame portion moves to a position alongside but exteriorly of a respective one of the side walls of the chamber.

10. A rotational moulding machine comprising a housing that encloses and defines a chamber for receiving and processing a mould, a spindle arm member having means thereon for attaching said mould thereto and being rotatable for rotatably moving said mould, support means for said spindle arm member and means mounted on said support means for driving said spindle arm member, said housing comprising a base portion including a base member for mounting the base portion upon a floor surface, and a plurality of upstanding walls surrounding the base member including a front wall, a rear wall and two side walls, an upper cover member including a top and a plurality of depending side walls with lowermost edges of the depending side walls meeting uppermost edges of the upstanding walls of the base portion so as to form with the base portion in a closed position of the cover member said enclosed housing, the upper cover member being movably mounted on said base portion from said closed position to an open position in which the cover member is moved away from the upper most edges of the upstanding walls to allow direct vertical access to said base portion, door means comprising a hinged door panel defined by said front wall pivotally movable about a horizontal axis parallel to a lowermost edge of the front wall, said support means comprising a first frame portion connected to said door panel for movement therewith and a pair of second frame portions each mounted on the first frame portion and each arranged to extend therefrom, in a closed position of the door panel, along an outer side of a respective one of the two upstanding side walls, said spindle arm member extending from one of said pair of second frame portions to the other of the pair of second frame portions across said upper most edges of said upstanding side walls, movement of said door panel from said closed position to said open position causing movement of said spindle arm member and said mould from a position inside said chamber to a position above the opened door panel.

11. A rotational moulding machine comprising a housing that encloses and defines a chamber for receiving and processing a mould, a spindle arm member having means thereon for attaching said mould thereto and being rotatable for rotatably moving said mould, support means for said spindle arm member and means mounted on said support means for driving said spindle arm member, said housing comprising a base portion including a base member for mounting the base portion upon a floor surface, and a plurality of upstanding walls surrounding the base member including a front wall, a rear wall and two side walls, an upper cover member including a top and a plurality of depending side walls with lowermost edges of the depending side walls meeting uppermost edges of the upstanding walls of the base portion so as to form with the base portion in a closed position of the cover member said enclosed housing, the upper cover member being movably mounted on said base portion from said closed position to an open position in which the cover member is moved away from the upper most edges of the upstanding walls to allow direct vertical access to said base portion, door means defined substantially by said front wall and movable from a closed position closing said housing to an open position fully opening an area defined by said front wall, said support means comprising a pair of frame portions each pivotally mounted to said base portion exteriorly of the housing and each arranged to extend, in an operative position, along an outer side of a respective one of the two upstanding side walls, said spindle arm member extending from one of said pair of frame portions to the other of the pair of frame portions across said upper edge of said upstanding side walls, said frame portions being movable in a direction parallel to said upstanding side walls from said operative position to a retracted position causing movement of said spindle arm member and said mould from a position inside said chamber to a position in front of the housing.

* * * * *